US012243507B2

(12) United States Patent
Honda et al.

(10) Patent No.: US 12,243,507 B2
(45) Date of Patent: *Mar. 4, 2025

(54) GAIN ADJUSTMENT IN ANR SYSTEM WITH MULTIPLE FEEDFORWARD MICROPHONES

(71) Applicant: Bose Corporation, Framingham, MA (US)

(72) Inventors: Masanori Honda, Northborough, MA (US); Ricardo F. Carreras, Southborough, MA (US); Joseph H. Cattell, Somerville, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,569

(22) Filed: Apr. 19, 2023

(65) Prior Publication Data

US 2024/0021185 A1 Jan. 18, 2024

Related U.S. Application Data

(63) Continuation of application No. 16/423,776, filed on May 28, 2019, now Pat. No. 11,651,759.

(51) Int. Cl.

*G10K 11/178* (2006.01)
*H04R 1/10* (2006.01)
*H04R 3/00* (2006.01)

(52) U.S. Cl.

CPC .. *G10K 11/17833* (2018.01); *G10K 11/17837* (2018.01); *G10K 11/17853* (2018.01);

(Continued)

(58) Field of Classification Search

CPC ....... G10K 11/17881; G10K 11/17885; G10K 11/17833; G10K 11/17853;

(Continued)

(56) References Cited

U.S. PATENT DOCUMENTS 4,149,032 A 4/1979 Peters
8,073,150 B2 12/2011 Joho et al.

(Continued)

OTHER PUBLICATIONS

International Preliminary Report on Patentability in International Appln. No. PCT/US2020/034849, dated Dec. 9, 2021, 12 pages.

(Continued)

*Primary Examiner* — Carolyn R Edwards
*Assistant Examiner* — Kuassi A Ganmavo
(74) *Attorney, Agent, or Firm* — Fish & Richardson P.C.

(57) ABSTRACT

Technology described in this document can be embodied in a method that includes receiving a first input signal representing audio captured by a first sensor disposed in a signal path of an active noise reduction (ANR) device, and receiving a second input signal representing audio captured by a second sensor disposed in the signal path of the ANR device. The method also includes processing, by at least one compensator, the first input signal and the second input signal to generate a drive signal for an acoustic transducer of the ANR device. A gain applied to the signal path is at least 3 dB less relative to an ANR signal path having a single sensor.

20 Claims, 8 Drawing Sheets

(52) U.S. Cl.
CPC ......... *H04R 1/1016* (2013.01); *H04R 1/1083* (2013.01); *H04R 3/005* (2013.01); *G10K 2210/1081* (2013.01); *G10K 2210/3028* (2013.01); *H04R 2460/01* (2013.01)

(58) Field of Classification Search
CPC ..... G10K 11/17837; G10K 2210/1081; G10K 2210/3028; H04R 1/1016; H04R 3/005; H04R 1/1083; H04R 2460/01
See application file for complete search history.

(56) References Cited

U.S. PATENT DOCUMENTS

| | | | | |
|---|---|---|---|---|
| 8,073,151 | B2 | 12/2011 | Joho et al. | |
| 8,447,045 | B1 | 5/2013 | Laroche | |
| 8,472,636 | B2 | 6/2013 | Sibbald | |
| 10,096,313 | B1 | 10/2018 | terMeulen et al. | |
| 11,651,759 | B2 | 5/2023 | Honda et al. | |
| 2004/0252852 | A1 | 12/2004 | Taenzer | |
| 2005/0249355 | A1 | 11/2005 | Chen | |
| 2006/0143017 | A1 | 6/2006 | Sonoura | |
| 2009/0041260 | A1 | 2/2009 | Jorgensen et al. | |
| 2010/0002891 | A1 | 1/2010 | Shiraishi et al. | |
| 2010/0131269 | A1 | 5/2010 | Park et al. | |
| 2010/0195842 | A1 | 8/2010 | Sibbald | |
| 2010/0296668 | A1 | 11/2010 | Lee | |
| 2011/0007907 | A1 | 1/2011 | Park | |
| 2011/0044465 | A1 | 2/2011 | D'Agostino | |
| 2011/0130176 | A1* | 6/2011 | Magrath | G10L 21/0208 381/71.13 |
| 2013/0170665 | A1 | 7/2013 | Wise et al. | |
| 2014/0086425 | A1* | 3/2014 | Jensen | G10K 11/17825 381/71.11 |
| 2014/0363010 | A1 | 12/2014 | Christopher | |
| 2015/0078600 | A1 | 3/2015 | Rasmussen et al. | |
| 2015/0172813 | A1 | 6/2015 | Goto et al. | |
| 2015/0279388 | A1 | 10/2015 | Taenzer | |
| 2016/0142815 | A1 | 5/2016 | Norris et al. | |
| 2016/0300562 | A1* | 10/2016 | Goldstein | G10K 11/17879 |
| 2016/0329042 | A1 | 11/2016 | Christoph | |
| 2017/0180878 | A1 | 6/2017 | Shiraishi et al. | |
| 2018/0020281 | A1* | 1/2018 | Wurtz | A61F 11/08 |
| 2018/0041828 | A1* | 2/2018 | Sibbald | G10K 11/17873 |
| 2018/0115839 | A1 | 4/2018 | Eichfeld et al. | |
| 2018/0366099 | A1 | 12/2018 | Unruh | |
| 2019/0364359 | A1 | 11/2019 | Ferguson | |
| 2019/0378491 | A1* | 12/2019 | Mohammad | G10K 11/17823 |
| 2020/0380948 | A1 | 12/2020 | Honda et al. | |

OTHER PUBLICATIONS

International Search Report and Written Opinion in International Appln. No. PCT/US2020/034849, dated Nov. 2, 2020, 15 pages.

Kinoshita Satoshi et al., "Multi-channel feedforward ANC system combined with noise source separation," 2015 Asia-Pacific Signal and Information Processing Association Annual Summit and Conference, 2015, 379-383.

Iwai et al. "Multichannel feedforward active noise control system combined with noise source separation by microphone arrays," Journal of Sound and Vibration, Apr. 15, 2019, 453:151-173.

Office Action in European Appln. No. 20733154.7, mailed on Jan. 3, 2024, 7 pages.

* cited by examiner

GAIN ADJUSTMENT IN ANR SYSTEM WITH MULTIPLE FEEDFORWARD MICROPHONES

CLAIM OF PRIORITY

This application claims priority under 35 USC § 119(e) to U.S. patent application Ser. No. 16/423,776, filed on May 28, 2019, the entire contents of which are hereby incorporated by reference.

TECHNICAL FIELD

This disclosure generally relates to active noise reduction (ANR) devices having multiple feedforward microphones.

BACKGROUND

Acoustic devices such as headphones can include active noise reduction (ANR) capabilities that block and constructively cancel at least portions of ambient noise from reaching the ear of a user. Therefore, ANR devices create an acoustic isolation effect, which isolates the user, at least in part, from the environment.

SUMMARY

In general, in one aspect, this document features a method that includes receiving a first input signal representing audio captured by a first sensor disposed in a signal path of an active noise reduction (ANR) device, and receiving a second input signal representing audio captured by a second sensor disposed in the signal path of the ANR device. The method also includes processing, by at least one compensator, the first input signal and the second input signal to generate a drive signal for an acoustic transducer of the ANR device. A gain applied to the signal path is at least 3 dB less relative to an ANR signal path having a single sensor.

In another aspect, this document features an active noise reduction (ANR) device that includes a first sensor disposed in a signal path of the device and configured to generate a first audio input signal. The ANR device also includes a second sensor disposed in the signal path of the ANR device and configured to generate a second audio input signal, and at least one compensator configured to receive and process the first audio input signal and the second audio input signal to generate a drive signal for an acoustic transducer of the ANR device. A gain of the signal path is at least 3 dB less relative to an ANR signal path having a single sensor.

In another aspect, this document features one or more machine-readable storage devices having encoded thereon computer readable instructions for causing one or more processing devices to perform various operations. The operations include receiving a first input signal representing audio captured by a first sensor disposed in a signal path of an active noise reduction (ANR) device, and receiving a second input signal representing audio captured by a second sensor disposed in the signal path of the ANR device. The operations also include processing the first input signal and the second input signal to generate a drive signal for an acoustic transducer of the ANR device. A gain of the signal path is at least 3 dB less relative to an ANR signal path having a single sensor.

Implementations of the above aspects can include one or more of the following features.

Processing the first input signal and the second input signal to generate the drive signal can include combining the first input signal and the second input signal to generate a combined input signal, applying, using an amplifier, a gain to the combined input signal, and filtering, by the at least one compensator, an output of the amplifier to generate the drive signal for the acoustic transducer. The amplifier can be disposed as a part of the at least one compensator. Processing the first input signal and the second input signal to generate the drive signal can include applying, using a first amplifier, a first gain to the first input signal to generate a first amplified input signal, and filtering, by a first compensator, the first amplified input signal to generate a first processed signal for the acoustic transducer of the ANR device. The processing also includes applying, using a second amplifier, a second gain to the second input signal to generate a second amplified input signal, and filtering, by a second compensator, the second input signal to generate a second processed signal for the acoustic transducer of the ANR device. The processing further includes combining the first processed signal and the second processed signal to generate the drive signal for the acoustic transducer. The first compensator can apply one or more filters to the first amplified input signal and the second compensator can apply one or more filters to the second amplified input signal. The one or more filters applied to the second amplified signal can be different from the one or more filters applied to the first amplified signal. Processing the first input signal and the second input signal to generate the drive signal can include processing, by a first compensator, the first input signal to generate a first processed signal for the acoustic transducer of the ANR device, processing, by a second compensator, the second input signal to generate a second processed signal for the acoustic transducer of the ANR device, and combining the first processed signal and the second processed signal to generate the drive signal for the acoustic transducer. The first compensator can apply a first gain and use one or more filters to generate the first processed signal. The second compensator can apply a second gain and use one or more filters to generate the second processed signal. Processing the first input signal and the second input signal to generate the drive signal can include applying, using a first amplifier, a first gain to the first input signal, applying, using a second amplifier, a second gain to the second input signal, combining the first input signal and the second input signal to generate a combined input signal, and filtering, by the at least one compensator, the combined input signal to generate the drive signal for the acoustic transducer. The first and second amplifiers can be part of the at least one compensator.

Two or more of the features described in this disclosure, including those described in this summary section, may be combined to form implementations not specifically described herein. The details of one or more implementations are set forth in the accompanying drawings and the description below. Other features, objects, and advantages will be apparent from the description and drawings, and from the claims.

DETAILED DESCRIPTION

Figure 1:
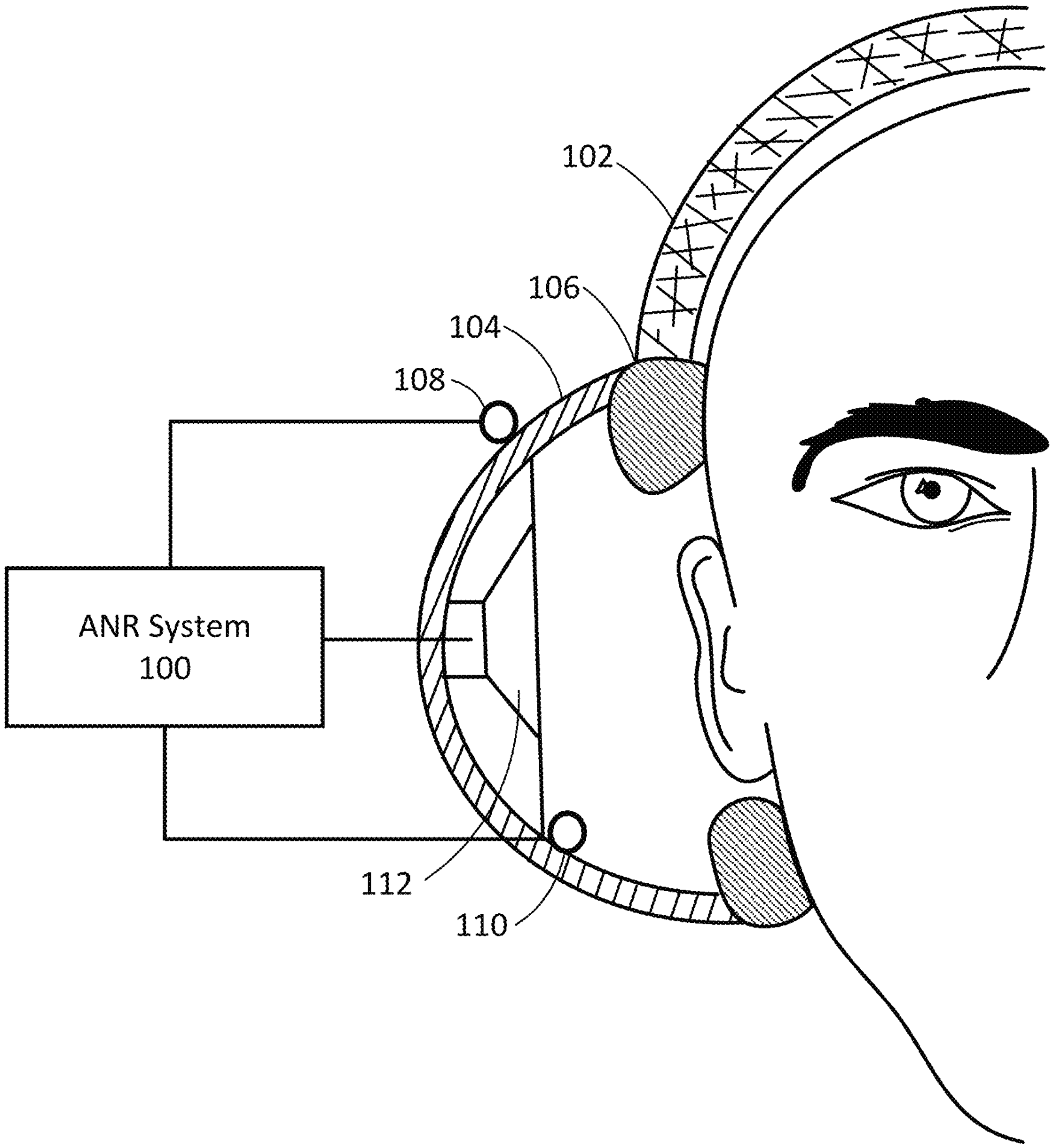
FIG. 1 shows an example of an active noise reduction (ANR) system deployed in a headphone.

This document describes technology that uses multiple feedforward microphones in an Active Noise Reduction (ANR) system to improve ANR performance, noise performance, and reduce the likelihood of an unstable condition. When an ANR system is deployed, for example, in noise canceling headphones, certain unstable conditions can cause the headphones to generate an acoustic artifact (e.g., a loud noise) that is uncomfortable for the user. By providing multiple feedforward microphones in the ANR system, the technology described herein allows for the gain through each of the feedforward signal paths to be reduced relative to the situation where a single feedforward microphone is used. Because the gain through an individual signal path is lower, there is more headroom in the system, which results in fewer opportunities for clipping, and there is more margin to deal with an instability that may arise, for example, due to coupling between one of the feedforward microphones and the transducer. In addition, the individual gains of the multiple feedforward microphones can be assigned based on their likelihood of coupling, such that the total target gain is not compromised as compared to a single microphone case. For example, if one of the microphones is at a location where the microphone is susceptible to coupling to the driver (and by extension, susceptible to instability), a lower gain can be applied to that microphone to reduce the likelihood of coupling. However, the gain for another microphone can be adjusted accordingly such that the target total gain of the feedforward microphones is not reduced. In one example, a target gain of unity can be allocated between two feedforward paths such that a first microphone that is more susceptible to coupling has a gain of 0.25, while a second microphone that is less susceptible to coupling has a gain of 0.75. Thus, while the gains of the individual signal paths are reduced as compared to unity (e.g., to allow the ANR system to tolerate non-ideal microphone locations, such as microphone locations that are closer to the periphery of the ear-cup or near a port, where there may be greater coupling between the microphone and the transducer), the total feedforward gain is not compromised due a weighted distribution of the gain between the multiple feedforward paths. In some implementations, the weighting can also be done on a frequency-by-frequency basis such that the distributions of gains among two or more feedforward paths are different for different frequencies (or frequency ranges).

Active Noise Reduction (ANR) systems can be deployed in a wide array of acoustic devices to cancel or reduce unwanted or unpleasant noise. For example, ANR headphones can provide potentially immersive listening experiences by reducing the effects of ambient noise and sounds. The term headphone, as used herein, includes various types of such personal acoustic devices such as in-ear, around-ear or over-the-ear headphones, earphones, earbuds, and hearing aids. ANR systems can also be used in automotive or other transportation systems (e.g., in cars, trucks, buses, aircrafts, boats or other vehicles) to cancel or attenuate unwanted noise produced by, for example, mechanical vibrations or engine harmonics.

In some cases, an ANR system can include an electroacoustic or electromechanical system that can be configured to cancel at least some of the unwanted noise (often referred to as "primary noise") based on the principle of superposition. For example, the ANR system can identify an amplitude and phase of the primary noise and produce another signal (often referred to as an "anti-noise signal") of approximately equal amplitude and opposite phase. The anti-noise signal can then be combined with the primary noise such that both are substantially canceled at a desired location. The term substantially canceled, as used herein, may include reducing the "canceled" noise to a specified level or to within an acceptable tolerance, and does not require complete cancellation of all noise. ANR systems can be used in attenuating a wide range of noise signals, including, for example, broadband noise and/or low-frequency noise that may not be easily attenuated using passive noise control systems.

FIG. 1 shows an example of an ANR system 100 deployed in a headphone 102. The headphone 102 includes an ear-cup 104 on each side, which fits on, around or over the ear of a user. The ear-cup 104 may include a layer 106 of soft material (e.g., soft foam) for a comfortable fit over the ear of the user. The ANR system 100 can include or otherwise be coupled with a feedforward sensor 108, a feedback sensor 110, and an acoustic transducer 112. The feedforward sensor 108 may be a microphone or another acoustic sensor and may be disposed on or near the outside of the ear-cup 104 to detect ambient noise. The feedback sensor 110 may be a microphone or another acoustic sensor and may be deployed proximate to the user's ear canal and/or the transducer 112. The transducer 112 can be an acoustic transducer that radiates audio signals from an audio source device (not shown) that the headphone 102 is connected to and/or other signals from the ANR system 100. While FIG. 1 illustrates an example where the ANR system is deployed in an around-ear headphone, the ANR system could also be deployed in other form-factors, including in-ear headphones, on-ear headphones, or off-ear personal acoustic devices (e.g., devices that are designed to not contact a wearer's ears, but may be worn in the vicinity of the wearer's ears on the wearer's head or on body).

The ANR system 100 can be configured to process the signals detected by the feedforward sensor 108 and/or the feedback sensor 110 to produce an anti-noise signal that is provided to the transducer 112. The ANR system 100 can be of various types. In some implementations, the ANR system 100 is based on feedforward noise cancellation, in which the primary noise is sensed by the feedforward sensor 108 before the noise reaches a secondary source such as the transducer 112. In some implementations, the ANR system 100 can be based on feedback noise cancellation, where the ANR system 100 cancels the primary noise based on the residual noise detected by the feedback sensor 110 and without the benefit of the feedforward sensor 108. In some implementations, both feedforward and feedback noise cancellation are used. The ANR system 100 can be configured to control noise in various frequency bands. In some implementations, the ANR system 100 can be configured to control broadband noise such as white noise. In some implementations, the ANR system 100 can be configured to control narrow band noise such as harmonic noise from a vehicle engine.

Figure 2:
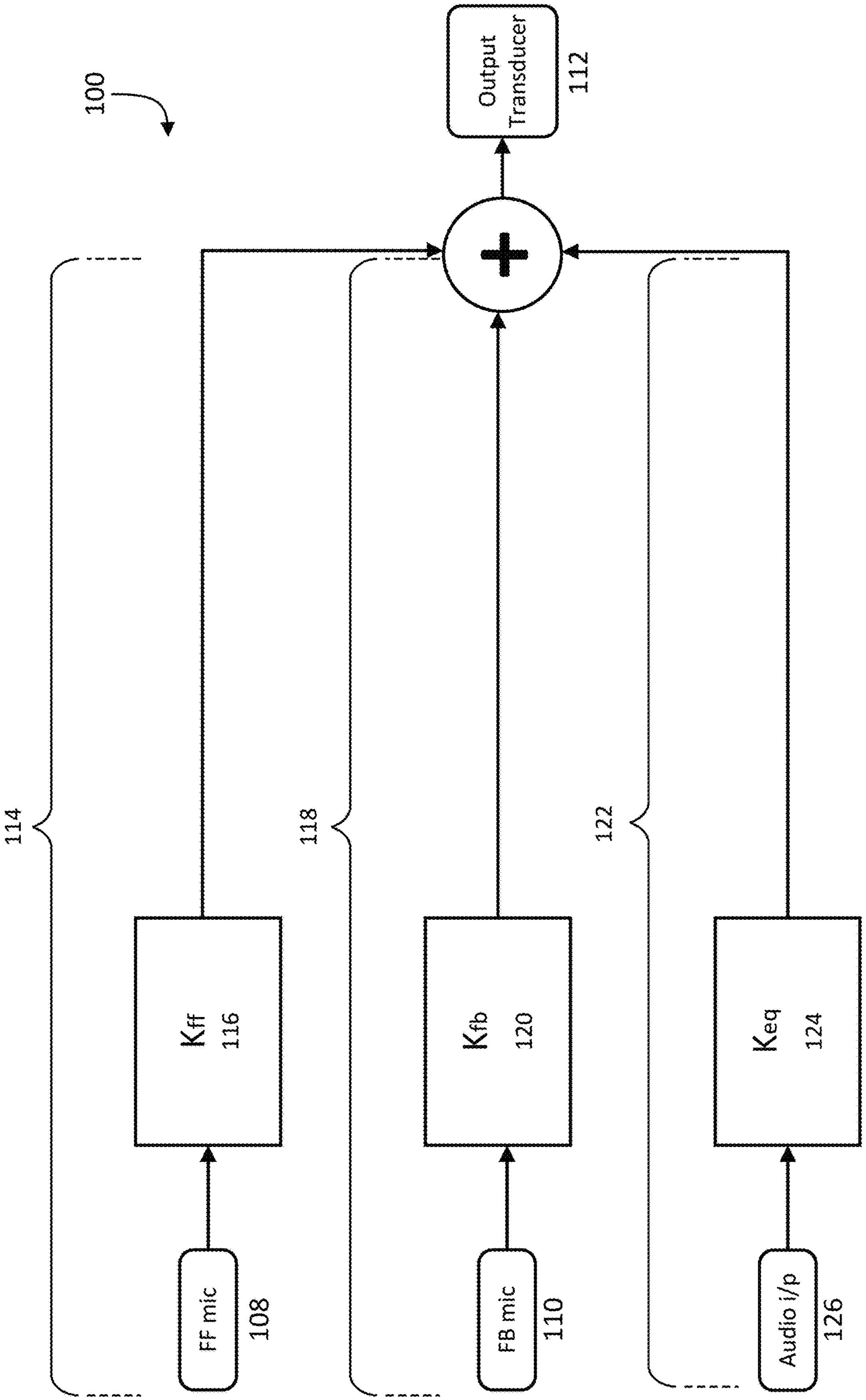
FIG. 2 is a block diagram of an example configuration in of an ANR system.

In some implementations, the ANR system 100 can include a configurable digital signal processor (DSP) and other circuitry for implementing various signal flow topologies and filter configurations. Examples of such DSPs are described in U.S. Pat. Nos. 8,073,150 and 8,073,151, which are incorporated herein by reference in their entirety. The various signal flow topologies can be implemented in the ANR system 100 to enable functionalities such as audio equalization, feedback noise cancellation, and feedforward noise cancellation, among others. For example, as shown in FIG. 2, the signal flow topologies of the ANR system 100 can include a feedforward signal flow path 114 that drives the transducer 112 to generate an anti-noise signal (using, for example, a feedforward compensator 116) to reduce the effects of a noise signal picked up by the feedforward sensor 108. In another example, the signal flow topologies can include a feedback signal flow path 118 that drives the transducer 112 to generate an anti-noise signal (using, for example, a feedback compensator 120) to reduce the effects of a noise signal picked up by the feedback sensor 110. The signal flow topologies can also include an audio path 122 that includes circuitry (e.g., an equalizer 124) for processing input audio signals 126 such as music or communication signals, for playback over the transducer 112.

In some implementations, the headphone 102 can include a feature that may be referred to as "talk-through" or a "hear-through mode." In such a mode, the feedforward sensor 108 or other detection means can be used to detect external sounds that the user might want to hear, and the ANR system 100 can be configured to pass such sounds through to be reproduced by the transducer 112. In some cases, the sensor used for the talk-through feature can be a sensor, such as a microphone, that is separate from the feedforward sensor 108. In some implementations, signals captured by multiple sensors can be used (e.g., using a beamforming process) to focus, for example, on the user's voice or another source of ambient sound. In some implementations, the headphone 102 can allow for multi-mode operations including a hear-through mode in which the ANR functionality may be switched off or at least reduced, over at least a range of frequencies (e.g., the voice band), to allow relatively wide-band ambient sounds to reach the user. In some implementations, the ANR system 100 can also be used to shape a frequency response of the signals passing through the headphones. For instance, the feedforward compensator 116 and/or the feedback compensator 120 may be used to change an acoustic experience of having an earbud blocking the ear canal to one where ambient sounds (e.g., the user's own voice) sound more natural to the user.

Figure 3:
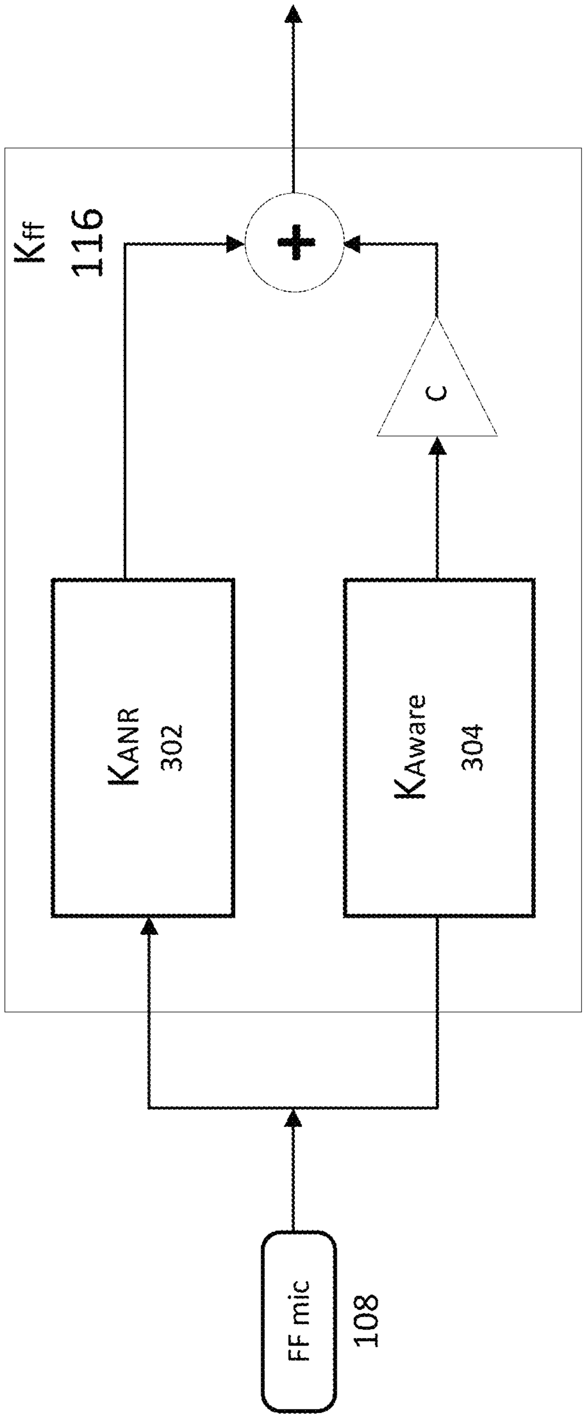
FIG. 3 is a block diagram of a feedforward compensator having an ANR signal flow path disposed in parallel with a pass-through signal flow path.

In some implementations, the ANR system 100 can allow a user to control the amount of ambient noise passed through the device while maintaining ANR functionalities, such as described in U.S. Pat. No. 10,096,313 which is incorporated herein by reference in its entirety. For example, to allow for intermediate target insertion gains between 0 and 1 and enable a user to control the amount of ambient noise passed through the device, the feedforward compensator 116 can include an ANR filter 302 and a pass-through filter 304 disposed in parallel, with the gain of the pass-through filter being adjustable by a factor C, as shown in FIG. 3. The adjustable gain C may be implemented using a variable gain amplifier (VGA) disposed in the pass-through signal flow path of the feedforward compensator 116.

In implementations where the headphone 102 includes a hear-through mode, some conditions can lead to the onset of an unstable condition. For example, if the output of the transducer 112 gets fed back to the feedforward sensor 108, and the ANR system 100 passes the signal back to the transducer 112, a fast-deteriorating unstable condition could occur, resulting in an objectionable sound emanating from the transducer 112. This condition may be demonstrated, for example, by cupping a hand around a headphone to facilitate a feedback path between the transducer 112 and the feedforward sensor 108. Such a feedback path may be established during use of the headphone, for example, if the user puts on a headgear (e.g., a head sock or winter hat) over the headphone 102.

In some implementations, the unstable condition can also occur even where the headphone 102 does not include a hear-through mode. For example, the unstable condition could occur due to changes in the transfer function of a secondary path (e.g., an acoustic path between the feedback sensor 110 and the transducer 112) of the ANR system 100. This can happen, for example, if the acoustic path between the transducer 112 and the feedback sensor 110 is changed in size or shape. This condition may be demonstrated, for example, by blocking the opening (e.g., using a finger or palm) through which sound emanates out of the headphone 102. In the case of a headphone having a nozzle with an acoustic passageway that acoustically couples a front cavity of an acoustic transducer to a user's ear canal, this condition may be referred to as a blocked-nozzle condition. This condition can result in practice, for example, during placement/removal of the headphone in the ear. This effect may be particularly observable in smaller headphones (e.g., in-ear earphones) or in-ear hearing aids, where the secondary path can change if the earphone or hearing-aid is moved while being worn. For example, moving an in-ear earphone or hearing aid can cause the volume of air in the corresponding secondary path to change, thereby causing the ANR system to be rendered unstable. In some cases, pressure fluctuations in the ambient air can also cause the ANR system to go unstable. For example, when the door or window of a vehicle (e.g., a bus door) is closed, an accompanying pressure change may cause an ANR system to become unstable. Another example of pressure fluctuations that can result in an unstable condition is a significant change in the ambient pressure of air relative to normal atmospheric pressures at sea level.

Unless an unstable condition is quickly detected and addressed, the unstable condition may cause the transducer 112 to produce acoustic artifacts (e.g., a loud audible noise), which may be uncomfortable for the wearer. The technology described herein uses multiple feedforward sensors, such as microphones, to improve ANR performance and reduce the likelihood of unstable conditions. In some implementations, when multiple feedforward sensors are used in the ANR system 100, the gain through each of the feedforward paths can be lower as compared to the case where a single feedforward sensor is used. Accordingly, the compensators, filters, and other circuitry in any individual signal path can have a lower overall gain than in the situation where a single feedforward sensor is used. Further, because the gain of any individual signal path is lower than compared to the situation where a single sensor is used, there is more headroom in the system, which results in fewer opportunities for clipping, and provides more margin to prevent instabilities, for example, due to coupling between the feedforward sensors and the transducer. The term headroom, as used herein, refers to the difference between the signal-handling capabilities of an electrical component and the maximum level of the signal in the signal path, such as the feedforward signal path. The reduced gain applied to any individual signal path may also allow the ANR system to better tolerate non-ideal sensor locations, such as sensor locations that are closer to the periphery of the ear-cup 104 where the chances of coupling between the sensor and the transducer may be higher as compared to a sensor located at a distance farther away from the periphery of the ear-cup 104.

Figure 4:
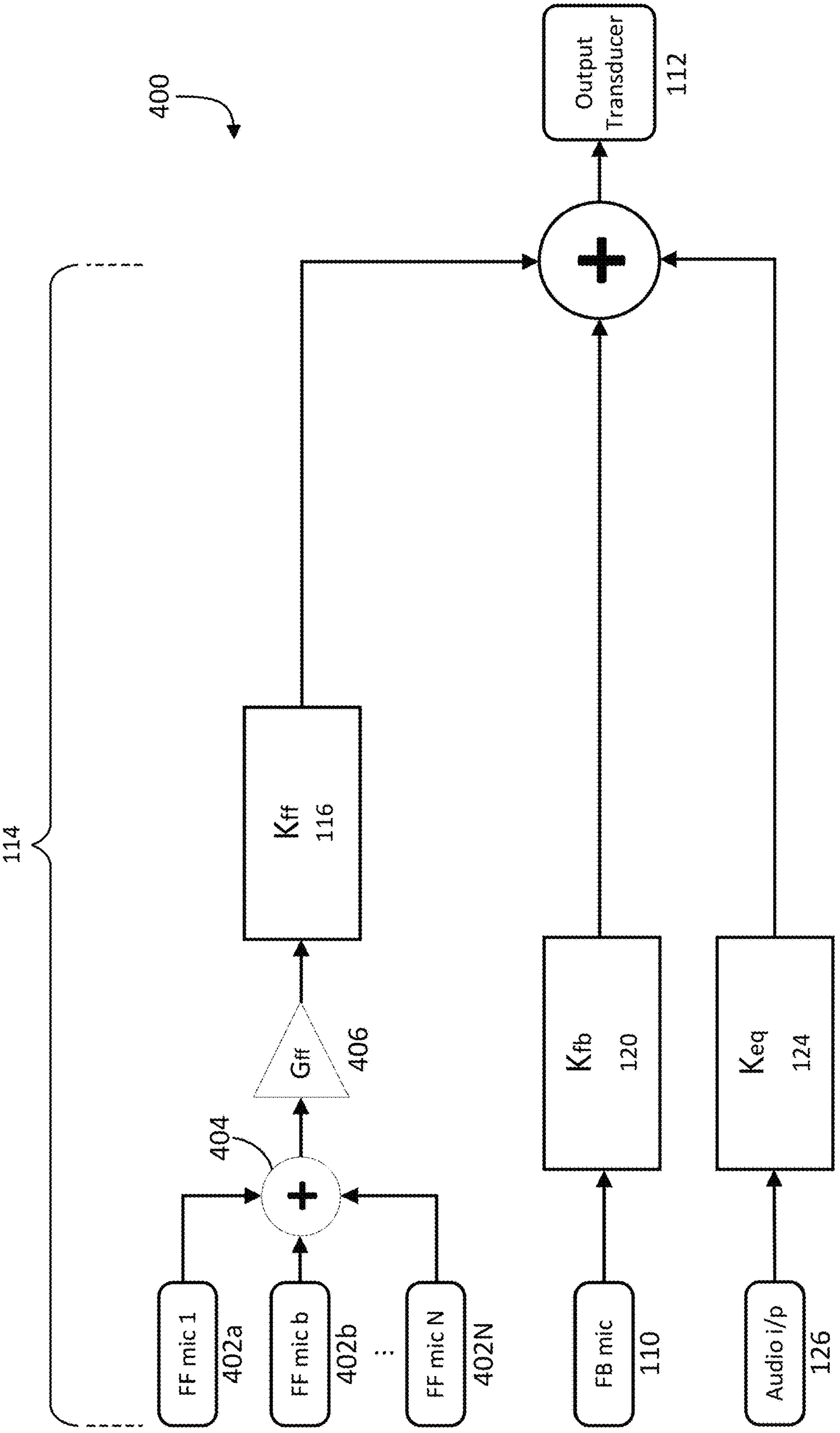
FIG. 4 is a block diagram of an ANR system with multiple feedforward sensors.

FIG. 4 is a block diagram of an ANR system 400 having multiple feedforward sensors 402*a*, 402*b*, . . . , 402N disposed along the feedforward path 114. Each of the feedforward sensors 402*a*, 402*b*, . . . , 402N may be an analog microphone, a digital microphone, or another acoustic sensor, and may be disposed on or near the outside of the ear-cup 104 to detect ambient noise. In some implementations, each of the feedforward sensors 402*a*, 402*b*, . . . , 402N may be positioned to detect ambient noise incident from a particular direction and/or to detect certain types or frequencies of ambient noise, such as a user's voice. The number of feedforward sensors included in the ANR system 400 can be as few as two sensors. In general, there is no upper bound to the number of feedforward sensors that can be included in the ANR system 400. In some implementations, practical considerations, such as space and cost, may create an upper bound for the number of sensors included in the system. In some implementations, technological limitations of other circuitry in the feedforward path 114, such as the compensator or the transducer, may create an upper bound for the number of sensors included in the system. Although the ANR system 400 is described in the context of deployment within the headphone 102, the techniques described herein are equally applicable to ANR systems deployed in other contexts, such as automotive or other transportation systems.

The ambient noise signal produced by each of the feedforward sensors 402*a*, 402*b*, . . . , 402N in the ANR system 400 may be combined using a combination circuit 404, such as a summing circuit. It should be understood that the combination circuit 404 can perform summation in either the digital or analog domain, and the location of the combination circuit 404 can vary along the feedforward signal path 114. While not shown, it should also be understood that the feedforward signal path 114 may include additional circuitry such as an amplifier and analog-to-digital converter. The gain of the combined signal may be adjusted by a gain factor $G_{ff}$ using a variable gain amplifier (VGA) 406 or other amplification circuitry disposed in the feedforward path 114. The gain factor $G_{ff}$ can be a reduced gain factor relative to a gain factor applied in an ANR system having a single feedforward sensor, as described in detail below. The feedforward compensator 116 can process the combined ambient noise signal to produce, for example, an anti-noise signal. In some implementations, the feedforward compensator 116 can include an ANR signal flow path disposed in parallel with a pass-through signal flow path to provide at least a portion of the ambient noise to a user, as described with reference to FIG. 3. In some implementations, the VGA 406 may be included within the feedforward compensator 116. The signal produced by the feedforward compensator 116 may be combined with other signals in the ANR system 400, such as the signals from the feedback path 118 and/or the audio path 122, and the resultant signal may be provided to the transducer 112.

In some implementations, the gain factor $G_{ff}$ can be selected by the ANR system 400 based on the number of the feedforward sensors 402*a*, 402*b*, . . . , 402N present in the system. For example, if the ANR system 400 includes two feedforward sensors, the gain factor $G_{ff}$ can be reduced by up to 50%, which in one example could be about 6 decibels (dB), relative to an ANR system having a single feedforward sensor. In other cases, if the ANR system 400 includes three feedforward sensors, the gain factor $G_{ff}$ can be reduced by up to 67%, which in one example could be about 9-10 dB, relative to an ANR system having a single feedforward sensor. In still other cases, if the ANR system 400 includes four feedforward sensors, the gain factor $G_{ff}$ can be reduced by up to 75%, which in one example could be about 12 dB relative to an ANR system having a single feedforward sensor.

In some cases, the ANR system 400 may adjust the gain factor $G_{ff}$ based on the intended application of the system, requirements of other parts of the system, or other practical considerations. For example, if the ANR system 400 includes two feedforward sensors, the gain factor $G_{ff}$ can be reduced by up to 50% relative to an ANR system having a single feedforward sensor, as described above. However, the ANR system 400 may reduce the gain by some amount less than 50% relative to an ANR system having a single feedforward sensor to accommodate, for example, signal-level requirements of the feedforward compensator 116.

The lower overall gain reduces the chance that coupling between, for example, the transducer 112 and one or more of the feedforward sensors 402*a*, 402*b*, . . . , 402N will lead to an instability. This in turn allows for non-ideal placement of one or more of the feedforward sensors 402*a*, 402*b*, . . . , 402N (e.g., near a location of acoustic leakage that could lead to coupling with the driver, such as near the periphery of the ear-cup or near an acoustic port). Further, combining the ambient noise signals detected by the multiple feedforward sensors may produce a combined ambient noise signal that has a higher signal to noise ratio than an ambient noise signal from a single sensor. For example, when the random noise generated by each feedforward path is uncorrelated to every other feedforward path, the overall combined noise can be reduced by a certain amount (e.g., 3 dB) per pair combination while obtaining a higher amount of total signal (e.g., 6 dB) per pair combination. This increases the performance of the ANR system 400 by, for example, reducing the noise floor and providing a more reliable signal for processing to generate an anti-noise signal.

Figure 5:
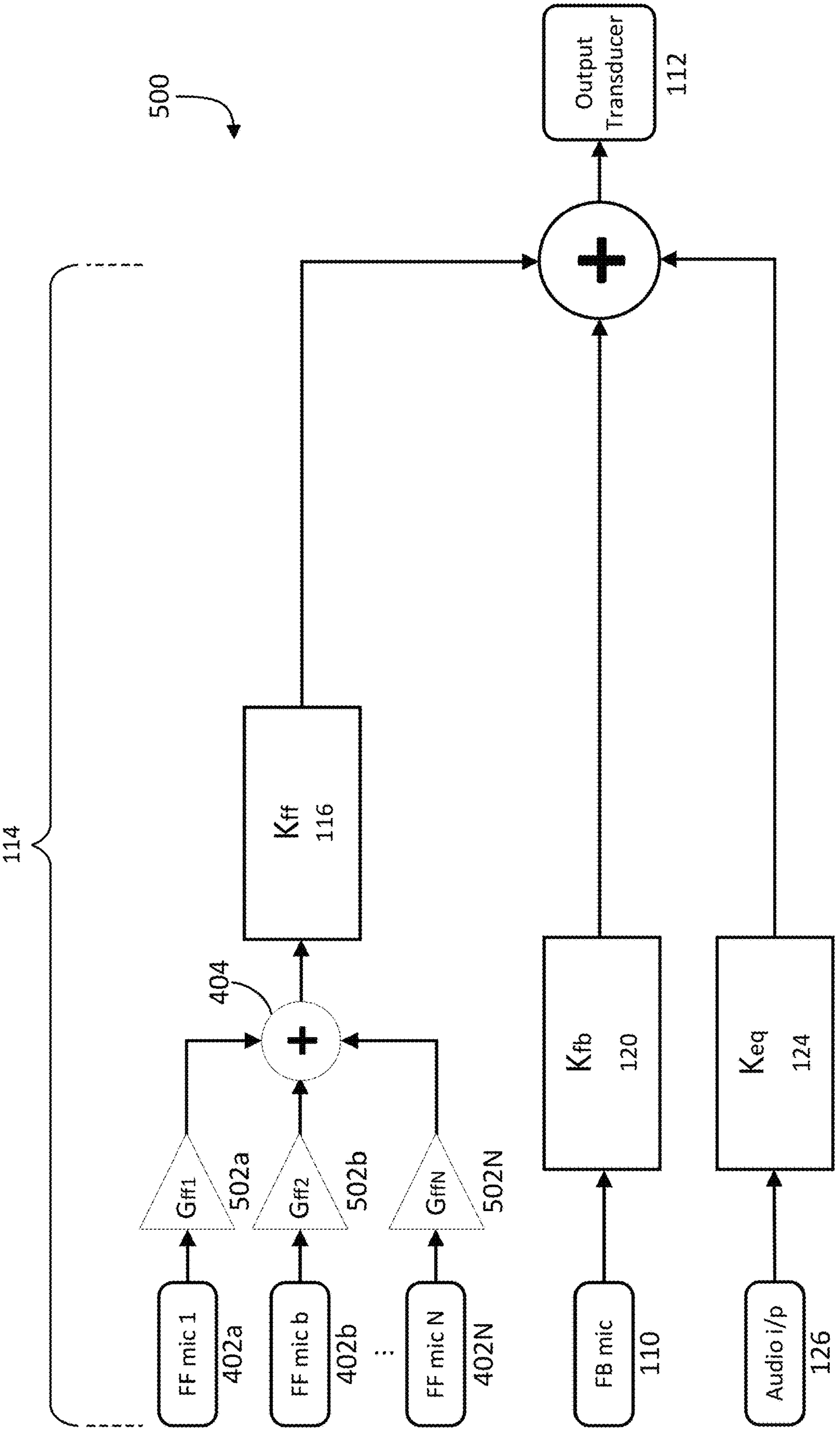
FIG. 5 is a block diagram of an ANR system with multiple feedforward sensors having independently controllable gains.

FIG. 5 depicts a block diagram of an ANR system 500 having multiple feedforward sensors 402*a*, 402*b*, . . . , 402N disposed along the feedforward signal path 114. As shown in FIG. 5, each feedforward sensor 402*a*, 402*b*, . . . , 402N can be coupled with a corresponding VGA 502*a*, 502*b*, . . . , 502N. Each of the VGAs 502*a*, 502*b*, . . . , 502N can be configured to apply a respective gain factor $G_{ff1}$, $G_{ff2}$, . . . , $G_{ffN}$ to the ambient noise signal produced by the corresponding feedforward sensor. For example, the VGA 502*a* can be coupled with the feedforward sensor 402*a* and can apply a gain factor $G_{ff1}$ to the signal generated by the feedforward sensor 402*a*, and so on. This in turn allows for the gains of the different feedforward microphones to be adjusted separately such that microphones that are more susceptible to coupling with a driver has a lower gain as compared to another microphone that is less susceptible to coupling. Also, the total target gain can be distributed across the different microphones such that the total feedforward gain is at a target level. For example, a target gain of unity can be distributed between two feedforward microphones such that a first microphone that is more susceptible to coupling has a gain of 0.25, while a second microphone that is less susceptible to coupling has a gain of 0.75.

The signal output by each of the VGAs 502a, 502b, . . . , 502N may be combined using the combination circuit 404 (e.g., a circuit including one or more adders). It should be understood that the combination circuit 404 can perform summation in either the digital or analog domain, and the location of the combination circuit 404 can vary along the feedforward signal path 114. While not shown, it should also be understood that the feedforward signal path 114 may include additional circuitry such as an amplifier and analog-to-digital converter. The feedforward compensator 116 can process the combined signal to produce, for example, an anti-noise signal. In some implementations, the feedforward compensator 116 can include an ANR signal flow path disposed in parallel with a pass-through signal flow path to provide at least a portion of the ambient noise to a user, as described with reference to FIG. 3. The signal produced by the feedforward compensator 116 may be combined with other signals in the ANR system 500, such as the signals from the feedback path 118 and/or the audio path 122, and the resultant signal may be provided to the transducer 112. While FIG. 5 shows the VGAs 502 and the combination circuit 404 as separate entities from the feedforward compensator 116, in some implementations, the VGAs 502 and the combination circuit 404 can be included as a part of the feedforward compensator 116.

The individual gain applied by each of the VGAs 502a, 502b, . . . , 502N, may be reduced relative to the gain applied in an ANR system having a single feedforward sensor. This in turn reduces the likelihood of an unstable condition in the system and increases ANR performance. The amount by which the gain is reduced may be determined by the ANR system 500 based on, for example, the number of feedforward sensors present in the system (as described with reference to FIG. 4) and/or other factors as described herein. Further, by providing a separate VGA 502a, 502b, . . . , 502N for each of the feedforward sensors 402a, 402b, . . . , 402N, the ANR system 500 can individually adjust the gain applied to the ambient noise signal produced by the respective feedforward sensor (e.g., through adjustments to $G_{ff1}$, $G_{ff2}$, . . . , $G_{ffN}$). In doing so, the ANR system 500 can exert control over the individual ambient noise signals before they are combined and processed by the feedforward compensator 116, without compromising on a target overall gain of the feedforward path.

Figure 6:
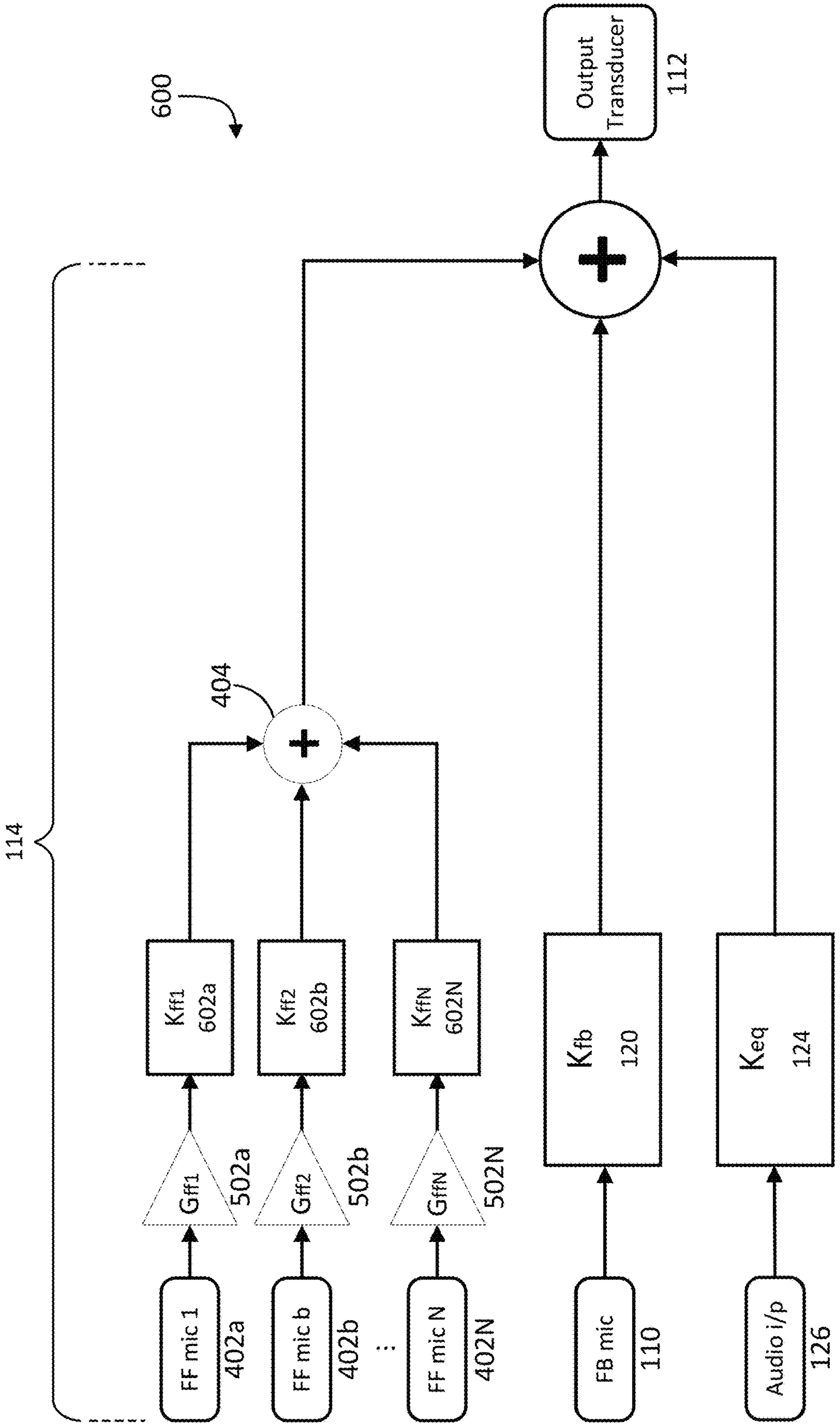
FIG. 6 is a block diagram of an ANR system with multiple feedforward sensors having independently controllable gains and independent compensators.

Referring to FIG. 6, in some implementations, an ANR system 600 may include a separate compensator 602a, 602b, . . . , 602N for each of the feedforward sensors 402a, 402b, . . . , 402N, respectively. As shown in FIG. 6, each compensator 602a, 602b, . . . , 602N may be coupled with a corresponding feedforward sensor 402a, 402b, . . . , 402N through the VGA 502a, 502b, 502N. In some implementations, a separate compensator for each feedforward sensor 402 allows for separate frequency-dependent filtering and/or gain assignment for the different feedforward paths. For example, if a particular microphone is located near the periphery or port where a coupling to a high-frequency driver is likely, a digital filter can be disposed in the corresponding compensator $K_{ff}$ to reduce the likelihood of such coupling. Such a digital filter can be configured to filter out a portion of the frequency spectrum of the signal captured by the particular microphone to reduce the likelihood of the coupling. In some cases, if the sensors/microphones 402 are located far apart from each other on the ear cup or earpiece, the signals captured by the microphones may not be correlated with one another. In such cases, different frequencies can be weighted differently, by applying an individual $K_{ff}$ to each of the microphones.

In some implementations, each compensator 602a, 602b, . . . , 602N can include the corresponding VGA 502a, 502b, . . . , 502N. Each compensator 602a, 602b, . . . , 602N may include one or more filters, controllers, or other circuitry to process the signal produced by the corresponding feedforward sensor to generate, for example, an anti-noise signal. In some implementations, each compensator 602a, 602b, . . . , 602N can include an ANR signal flow path disposed in parallel with a pass-through signal flow path to provide at least a portion of the ambient noise to a user, as described with reference to FIG. 3. The signals output by each of the compensators 602a, 602b, . . . , 602N may be combined using the combination circuit 404. It should be understood that the combination circuit 404 can perform summation in either the digital or analog domain, and the location of the combination circuit 404 can vary along the feedforward signal path 114. While not shown, it should also be understood that the feedforward signal path 114 may include additional circuitry such as an amplifier and analog-to-digital converter. The resultant signal may be combined with other signals in the ANR system 600, such as the signals from the feedback path 118 and/or the audio path 122, and the resultant signal may be provided to the transducer 112.

Figure 7:
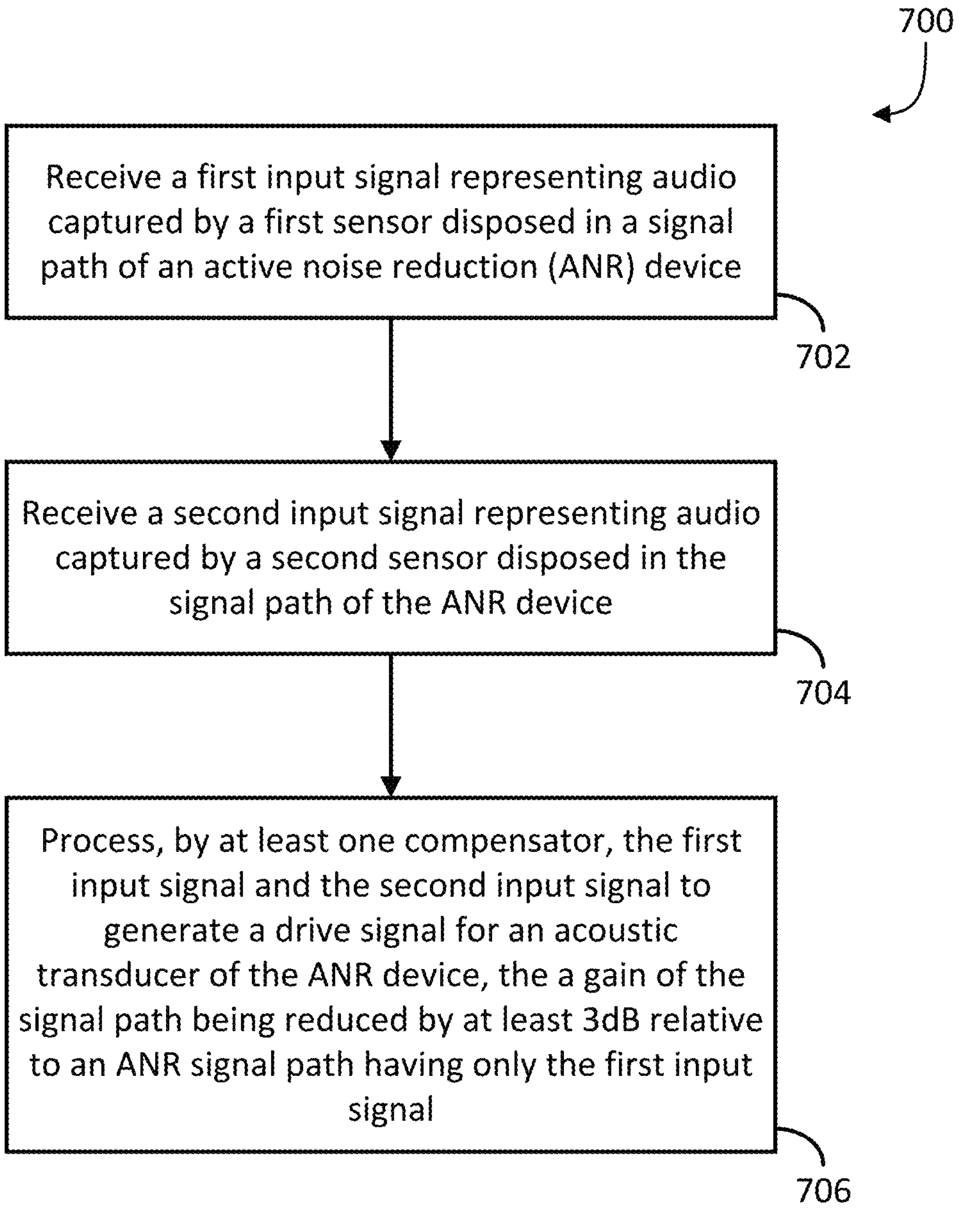
FIG. 7 is a flowchart of an example process for generating a drive signal in an ANR system having multiple sensors disposed in a signal path.

FIG. 7 is a flowchart of an example process for generating a drive signal in an ANR system having multiple acoustic sensors disposed in a signal path. At least a portion of the process 700 can be implemented using one or more processing devices such as DSPs described in U.S. Pat. Nos. 8,073,150 and 8,073,151, incorporated herein by reference in their entirety. Operations of the process 700 include receiving a first input signal representing audio captured by a first sensor disposed in a signal path of an ANR device (702). Operations of the process 700 also include receiving a second input signal representing audio captured by a second sensor disposed in the signal path of the ANR device (704). In some implementations, each of the first sensor and the second sensor include a microphone, such as a feedforward microphone of an ANR device. In some implementations, the ANR device can be an around-ear headphone such as the one described with reference to FIG. 1. In some implementations, the ANR device can include, for example, in-ear headphones, on-ear headphones, open headphones, hearing aids, or other personal acoustic devices. In some implementations, the audio captured by the first sensor and/or the second sensor can be ambient noise associated with the ANR device. In some implementations, the signal path can be a feedforward signal path of the ANR device. In some implementations, the gain of the signal path can be reduced relative to an ANR signal path having only the first input signal, such as described with reference to FIGS. 4 through 6.

Operations of the process 700 further include processing, by at least one compensator and/or variable gain amplifier, the first input signal and the second input signal to generate a drive signal for an acoustic transducer of the ANR device (706). In some implementations, the at least one compensator can include a feedback compensator and/or a feedforward compensator, such as described with reference to FIG. 2. In some implementations, the at least one compensator can include a compensator having an ANR signal flow path disposed in parallel with a pass-through signal flow path to provide at least a portion of the ambient noise to a user, as described with reference to FIG. 3. In some implementations, the drive signal may be combined with one or more additional signals (e.g., a signal produced in an audio path of the ANR device) before being provided to the acoustic transducer. The audio output of the acoustic transducer may therefore represent a noise-reduced audio combined with audio representing the ambience as adjusted in accordance with user-preference.

In some implementations, the processing in step 706 includes combining the first input signal and the second input signal to generate a combined input signal, applying a gain to the combined input signal using an amplifier, and processing the output of the amplifier using the at least one compensator to generate the drive signal for the acoustic transducer, such as described with reference to FIG. 4. In some implementations, the processing includes applying a first gain to the first input signal using a first amplifier, applying a second gain to the second signal using a second amplifier, combining the first input signal and the second input signal to generate a combined input signal, and processing the combined input signal using the at least one compensator to generate the drive signal for the acoustic transducer, such as described with reference to FIG. 5. In some implementations, the processing includes processing the first input signal using a first variable gain amplifier and compensator to generate a first processed signal for the acoustic transducer of the ANR device, processing the second input signal using a second variable gain amplifier and compensator to generate a second processed signal for the acoustic transducer of the ANR device, and combining the first processed signal and the second processed signal to generate the drive signal for the acoustic transducer, such as described with reference to FIG. 6. In each case, it should be understood that the variable gain amplifier(s) could be included within the respective compensators associated with the respective feedforward signal path.

While FIGS. 4 through 6 depict particular example arrangements of components for implementing the technology described herein, other components and/or arrangements of components may be used without deviating from the scope of this disclosure. In some implementations, the arrangement of components along a feedforward path can include an analog microphone, an amplifier, an analog to digital converter (ADC), a digital adder (in case of multiple microphones), a VGA, and a feedforward compensator, in that order. This arrangement is similar to the arrangement of components depicted in FIG. 4 with the addition of an amplifier and an ADC between each microphone 402 and combination circuit 404 (which, in this example, includes a digital adder). In some implementations, the arrangement of components along a feedforward path can include an analog microphone, an analog adder (in case of multiple microphones), an ADC, a VGA, and a feedforward compensator. This arrangement is also similar to the arrangement of components depicted in FIG. 4 with the combination circuit 404 including an analog adder, and an ADC disposed between the combination circuit 404 and the VGA 406. The arrangement of components can be selected based on target performance parameters. For example, in applications where limiting quantization noise is important, the latter arrangement can be selected because it introduces only a single noise source (an ADC) prior to the gain stage. However this can come at a cost of a dynamic range issue (because of the signals from all microphones passing through a single ADC), which in turn may cause clipping of signals captured by some of the microphones. On the other hand, if avoiding clipping is more important at the cost of potentially more quantization noise, the former arrangement (with an amplifier and an ADC disposed between each microphone 402 and combination circuit 404) may be used.

Figure 8:
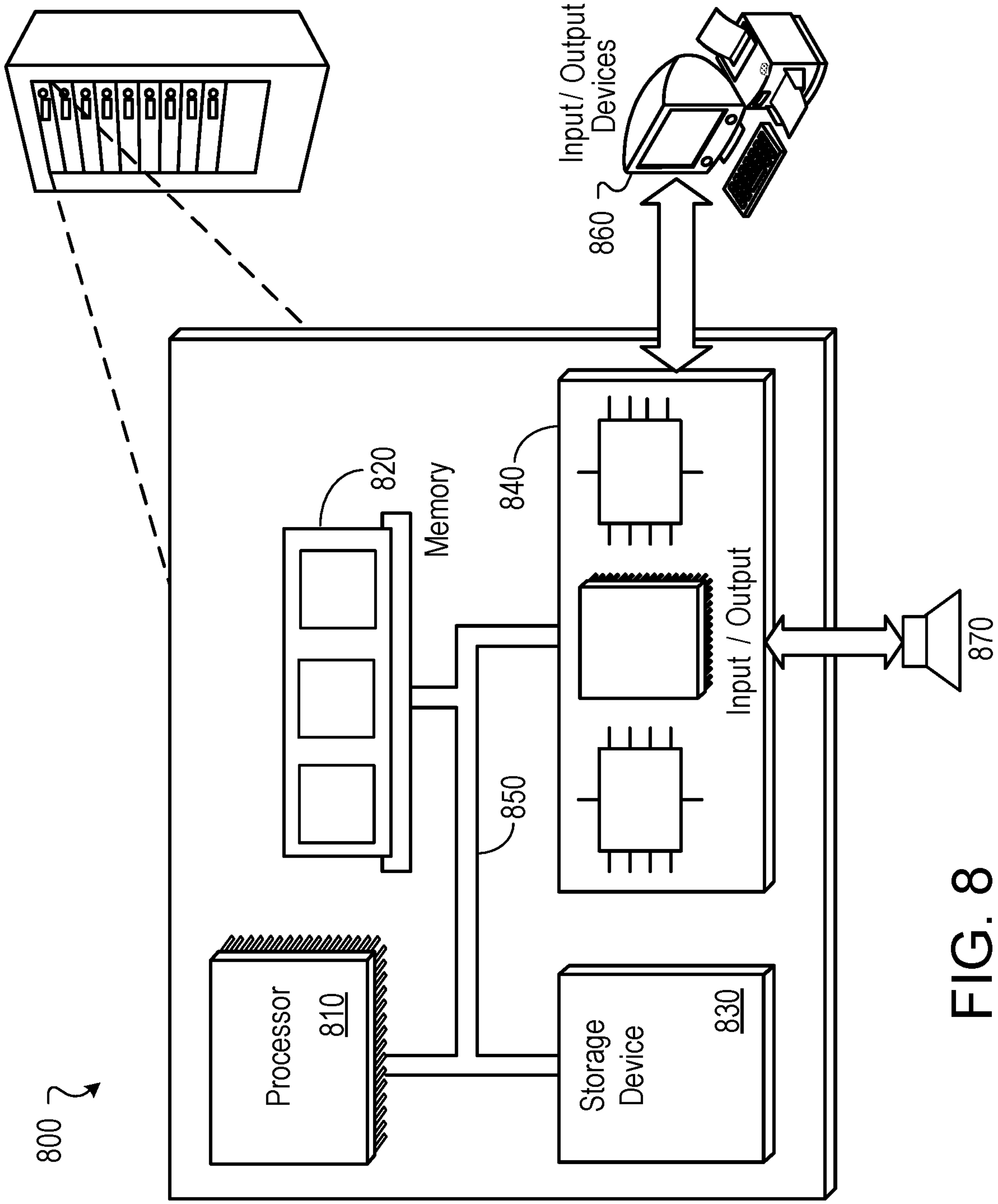
FIG. 8 is a block diagram of an example of a computing device.

FIG. 8 is block diagram of an example computer system 800 that can be used to perform operations described above. For example, any of the systems 400, 500, and 600, as described above with reference to FIGS. 4, 5, and 6, respectively, can be implemented using at least portions of the computer system 800. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In one implementation, the input/output device 840 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860, and acoustic transducers/speakers 870.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

To provide for interaction with a user, embodiments of the subject matter described in this specification can be implemented on a computer having a display device, e.g., a light emitting diode (LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Other examples and applications not specifically described herein are also within the scope of the following claims. Elements of different implementations described herein may be combined to form other examples not specifically set forth above. Elements may be left out of the structures described herein without adversely affecting their operation. Furthermore, various separate elements may be combined into one or more individual elements to perform the functions described herein.

What is claimed is:

1. A method comprising:

receiving an input signal produced by one of a plurality of sensors of an active noise reduction (ANR) device;

determining a gain for the input signal based on:

a number of the plurality of sensors of the ANR device, and a relationship between a likelihood of coupling to an acoustic transducer of the ANR device for each of the plurality of sensors, the likelihood of coupling being determined based on a known location of each of the plurality of sensors relative to an acoustic leakage point of the ANR device; and applying the gain to the input signal to generate a drive signal for the acoustic transducer of the ANR device.

2. The method of claim 1, further comprising:

receiving a second input signal produced by another one of the plurality of sensors of the ANR device;

determining a second gain for the second input signal based on:

the number of the plurality of sensors of the ANR device, and the relationship between the likelihood of coupling to the acoustic transducer of the ANR device for each of the plurality of sensors; and applying the second gain to the second input signal to generate the drive signal for the acoustic transducer of the ANR device.

3. The method of claim 2, wherein a value of the gain is different than a value of the second gain.

4. The method of claim 2, wherein determining the gain and the second gain comprises allocating a target gain among the gain applied to the input signal and the second gain applied to the second input signal based at least in part on the number of the plurality of sensors and the relationship between the likelihood of coupling to the acoustic transducer of the ANR device for each of the plurality of sensors.

5. The method of claim 1, wherein the gain is selected based at least in part on one or more frequencies of the input signal.

6. The method of claim 1, wherein each of the plurality of sensors comprise a feedforward sensor disposed in a feedforward signal path of the ANR device.

7. The method of claim 1, wherein each of the plurality of sensors comprise a feedback sensor disposed in a feedback signal path of the ANR device.

8. The method of claim 1, further comprising:

combining the input signal with a second input signal produced by another one of the plurality of sensors to generate a combined input signal;

applying, using an amplifier, a gain to the combined input signal; and processing, by at least one compensator, an output of the amplifier to generate the drive signal for the acoustic transducer.

9. The method of claim 1, further comprising:

applying, using a first amplifier, the gain to the input signal to generate a first amplified input signal;

processing, by a first compensator, the first amplified input signal to generate a first processed signal for the acoustic transducer of the ANR device;

applying, using a second amplifier, a second gain to a second input signal produced by another one of the plurality of sensors to generate a second amplified input signal;

processing, by a second compensator, the second input signal to generate a second processed signal for the acoustic transducer of the ANR device; and combining the first processed signal and the second processed signal to generate the drive signal for the acoustic transducer.

10. The method of claim 9, wherein the first compensator applies one or more first filters to the first amplified input signal, and wherein the second compensator applies one or more second filters to the second amplified input signal, the one or more second filters being different from the one or more first filters.

11. The method of claim 1, further comprising:

applying, using a first amplifier, the gain to the input signal;

applying, using a second amplifier, a second gain to a second input signal produced by another one of the plurality of sensors;

combining the input signal and the second input signal to generate a combined input signal; and processing, by at least one compensator, the combined input signal to generate the drive signal for the acoustic transducer.

12. An active noise reduction (ANR) device, comprising:

an acoustic transducer;

a plurality of sensors; and circuitry configured to:

receive an input signal produced by one of the plurality of sensors;

determine a gain for the input signal based on:

a number of the plurality of sensors of the ANR device, and a relationship between a likelihood of coupling to the acoustic transducer for each of the plurality of sensors, the likelihood of coupling being determined based on a known location of each of the plurality of sensors relative to an acoustic leakage point of the ANR device; and apply the gain to the input signal to generate a drive signal for the acoustic transducer of the ANR device.

13. The device of claim 12, wherein determining the gain comprises allocating a portion of a target gain to the input signal based at least in part on the number of the plurality of sensors and the relationship between the likelihood of coupling to the acoustic transducer for each of the plurality of sensors.

14. The device of claim 12, wherein each of the plurality of sensors comprise a feedforward sensor disposed in a feedforward signal path of the ANR device.

15. The device of claim 12, wherein each of the plurality of sensors comprise a feedback sensor disposed in a feedback signal path of the ANR device.

16. The device of claim 12, further comprising:

a combination circuit configured to combine the input signal with second audio input signal produced by another one of the plurality of sensors to generate a combined input signal; and an amplifier configured to apply a gain to the combined input signal, wherein the circuitry is configured to process an output of the amplifier to generate the drive signal for the acoustic transducer.

17. The device of claim 12, further comprising:

a first amplifier configured to apply the gain to the input signal to generate a first amplified input signal;

a first compensator configured to process the first amplified input signal to generate a first processed signal;

a second amplifier configured to apply a second gain to a second input signal produced by another one of the plurality of sensors to generate a second amplified input signal;

a second compensator configured to process the second amplified input signal to generate a second processed signal; and a combination circuit configured to combine the first processed signal and the second processed signal to generate the drive signal for the acoustic transducer.

18. The device of claim 17, wherein the first compensator is configured to apply one or more first filters to the first amplified input signal, and wherein the second compensator is configured to apply one or more second filters to the second amplified input signal, the one or more second filters being different from the one or more first filters.

19. The device of claim 12, further comprising:

a first amplifier configured to apply the gain to the input signal;

a second amplifier configured to apply a second gain to a second input signal produced by another one of the plurality of sensors; and a combination circuit configured to combine the input signal and the second input signal to generate a combined input signal, wherein the circuitry is configured to process the combined input signal to generate the drive signal for the acoustic transducer.

20. One or more machine-readable storage devices having encoded thereon computer readable instructions for causing one or more processing devices to perform operations comprising:

receiving an input signal produced by one of a plurality of sensors of an active noise reduction (ANR) device;

determining a gain for the input signal based on:

a number of the plurality of sensors of the ANR device, and a relationship between a likelihood of coupling to an acoustic transducer of the ANR device for each of the plurality of sensors, the likelihood of coupling being determined based on a known location of each of the plurality of sensors relative to an acoustic leakage point of the ANR device; and applying the gain to the input signal to generate a drive signal for the acoustic transducer of the ANR device.

* * * * *